(12) United States Patent
Stempinski (10) Patent No.: US 6,865,851 B2
(45) Date of Patent: Mar. 15, 2005

(54) MODULAR FLOOR PANELS WITH ENCLOSED WIREWAY CHANNELS

(75) Inventor: Shawn Stempinski, Newington, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 10/630,396

(22) Filed: Jul. 30, 2003

(65) Prior Publication Data
US 2004/0226235 A1 Nov. 18, 2004

Related U.S. Application Data
(60) Provisional application No. 60/470,573, filed on May 14, 2003.

(51) Int. Cl.[7] .............................. E04C 2/52; E04B 5/48
(52) U.S. Cl. .................... 52/220.2; 52/220.1; 52/220.2; 52/220.3; 52/220.5; 52/126.2; 52/126.5
(58) Field of Search ....................... 52/220, 221, 220.2, 52/220.3, 220.5, 220.8, 220.1, 220.7, 302, 303, 126.2, 126.5, 126.3, 126.6, 126.7, 407, 239, 263

(56) References Cited

U.S. PATENT DOCUMENTS

| | | | | |
|---|---|---|---|---|
| 4,250,674 A | * | 2/1981 | Feist .......................... | 52/220.3 |
| 4,682,453 A | * | 7/1987 | Holmgren .................. | 52/126.2 |
| 4,858,401 A | * | 8/1989 | Thorp et al. .................. | 52/100 |
| 5,263,289 A | * | 11/1993 | Boyd ........................ | 52/220.2 |
| 5,400,554 A | * | 3/1995 | Lo ............................. | 52/126.5 |
| 5,483,776 A | * | 1/1996 | Poppe ....................... | 52/220.3 |
| 5,828,001 A | * | 10/1998 | Schilham ..................... | 174/58 |
| 5,992,108 A | * | 11/1999 | Falcey ....................... | 52/220.2 |
| 6,076,315 A | * | 6/2000 | Kondo ...................... | 52/220.1 |
| 6,189,289 B1 | * | 2/2001 | Quaglia et al. ............... | 52/764 |
| 6,550,195 B1 | * | 4/2003 | Cooper et al. ............. | 52/220.3 |

* cited by examiner

Primary Examiner—Rodney B. White
(74) Attorney, Agent, or Firm—McCormick, Paulding & Huber LLP (57) ABSTRACT

Rectangular floor panels fit together to define a raised floor capable of accommodating wires/cables in a space within a building. Orthogonally arranged wireways are defined in a molded plastic portion that provides passageways between these wireways, and support post or pillars receive a composite top panel. The plastic panel portion has removable segments to accommodate outlet device brackets made accessible through openings in the top panel. One version has a recessed center portion of the plastic panel that can be fitted with an insert to define a central wireway channel, or to receive a centrally located floor box and hinged access door. Another version has a somewhat larger recessed center cavity with a smaller removable segment that can be left in place to better support the top panel when left in place. Removal of this center support/segment allows access to the wireways for the wires/cables in the orthogonally arranged wireways.

12 Claims, 8 Drawing Sheets

MODULAR FLOOR PANELS WITH ENCLOSED WIREWAY CHANNELS

This application is related to an earlier filed Provisional Application Ser. No. 60/470,573 filed May 14, 2003 entitled "Modular Floor Panels with Enclosed Wireway Channels" which is incorporated by reference herein.

BACKGROUND OF THE INVENTION

This invention relates generally to an improvement in modular floor panels and the systems made up therefrom, and deals more particularly with a modular floor panel that can be laid over a structural subfloor and will allow electrical and communications cabling to be accommodated and enclosed raceway channels defined therein.

The chief object of the present invention is to provide a structural hollow floor panel of minimal vertical height, and yet provide the necessary wireways or channels to accommodate the cabling associated with present day industrial and computer areas within a building structure.

The present disclosure relates to improvement in a system described in U.S. Pat. No. 5,263,289. The disclosure in the '289 patent is incorporated by reference herein.

The present invention also represents an improvement over a raised floor panel system currently sold by LEGRAND SNC, 87045 Limoges, France and will be found in the LEGRAND 2001/2002 catalog. That system is marketed by LEGRAND under the Trademark DL PASS. The LEGRAND DL PASS floor panel defines upwardly open and downwardly open raceway channels together with interconnecting generally vertically oriented sets and subsets of ducts enabling communication passageways between the upper and lower raceways. The upper raceways run in one direction and the lower raceways run in a direction perpendicular to the one direction so that data/communication and power cables can be run in either a longitudinal or a lateral direction in the LEGRAND floor system. The injection molded floor panel rests directly on the subfloor so that the subfloor acts as a cover for the lower raceways. The upper raceway channels are enclosed by a floor panel which is structural, and which is of wood or composite material. Special panels are required to accommodate floor boxes, and the installer in the field must rework both the plastic injection molded panel and the cover panel in order to accommodate the junction box within the panel in the LEGRAND system.

In accordance with one aspect of the present invention the floor panel is molded from a synthetic plastic material to have a generally square or rectangular plan-form, with upwardly projecting longitudinally extending ribs defining at least two upwardly open channels. Downwardly projecting laterally extending ribs define at least two downwardly open channels oriented orthogonally to the upper channels. Access passageways are defined in part by gaps in the upwardly projecting ribs, which access passageways are further defined in part by adjacent sections of the downwardly open channels themselves. This allows cables to be passed between said upwardly and downwardly open channels. An upwardly open recess is provided between these two upwardly open channels, and between the two downwardly open channels so that an insert can be provided in this recess to provide a floor panel of geometry somewhat similar to that of the LEGRAND channel. However, unlike the LEGRAND system this insert can be removed in the field with a minimum of effort, to be replaced by a service or junction box capable of accommodating data and/or power outlet plugs and jacks.

In accordance with another aspect of the present invention the floor panel open recess provided between the two open channels is adapted to accommodate one or more activation brackets for power and data outlets, or to accommodate the centrally located outlet box.

The present invention further includes generally flat cover strips for enclosing the space defined by the downwardly open channels, without relying on a subfloor to accomplish this purpose. This is an important advantage as it avoids the need for providing the more expensive armor clad cabling otherwise required in prior art systems generally, and in the LEGRAND system in particular.

Finally, the present invention calls for a top panel of composite structural material such as is used in the LEGRAND floor panel system. Like the LEGRAND System the injection molded panel further includes peripherally arranged hollow post defining portions or pillars in order to provide the structural strength for the resulting floor so as to support relatively heavy equipment including computer systems and associated hardware. These posts or pillars of the present disclosure are similar to those utilized in the LEGRAND floor system, and are also shown in the prior art '289 patent incorporated by reference herein.

For additional strength a removable center portion has a raised rib of a "T" shape provided centrally of the molded panel to cooperate with the pillars in supporting the floor panel. Removal is necessary only to incorporate a central electrical outlet box of the type known as a "poke-through" device.

DETAILED DESCRIPTION OF FIGS. 1–5 OF THE DRAWINGS

Figures 1, 2:
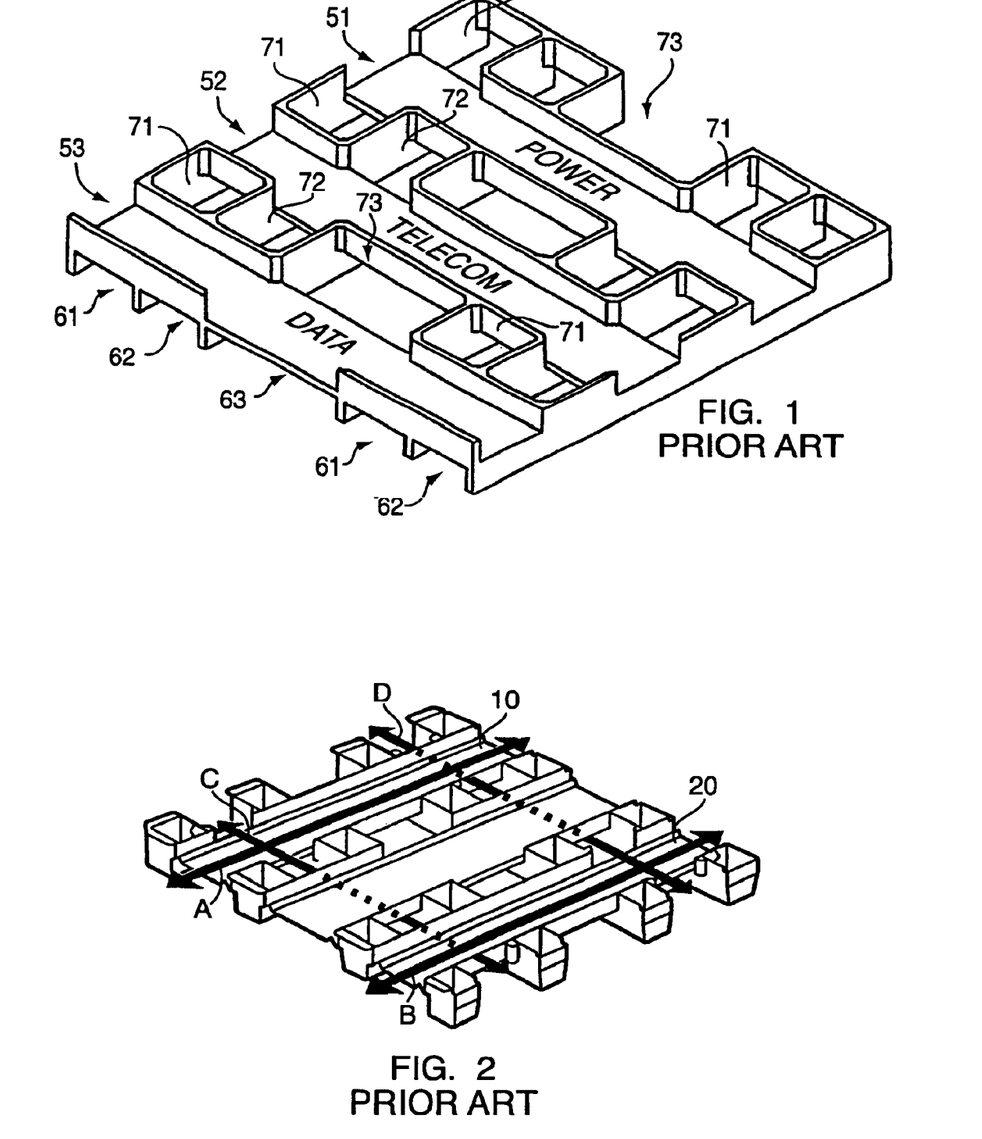
FIG. 1 shows the panel from prior art U.S. Pat. No: 5,632,289.
FIG. 2 shows a LEGRAND panel with the arrows depicting the paths taken by cabling in both the upper and lower raceway channels.

Turning now the drawings in greater detail, FIG. 1 shows the injection moldable synthetic plastic panel of U.S. Pat. No. 5,632,289. This panel defines upwardly open raceway channels for power, telecomm and data cabling. Downwardly open raceway channels 61, 62 and 63 can accommodate cabling for running the cables in a direction perpendicular to the upwardly open channels 51, 52 and 53. Further, vertical ducts 71 and 72 are provided for routing cabling between these upwardly and downwardly open raceway channels.

As so constructed and arranged a cover panel (not shown) can be provided on top of the FIG. 1 panel structure with the result that enclosed channels 51, 52, 53 are provided for the cabling in the upper raceways. The subfloor (not shown) will enclose the downwardly open raceway channels. This prior art floor panel allows only relatively small openings 73 to accommodate floor box or junction boxes that will provide access to the cabling within the raceway for purposes of power plugs and data/telecommunication jacks.

The LEGRAND system of FIG. 2 also illustrates an injection molded floor panel with parallel raceways (shown by arrows A, B) above and below (C, D) the center line or center plane of the panel, which center plane is defined by the webs 10, 20 of these various channels as in the '289 patent. Here again, the LEGRAND panel does not afford any convenient means for installing the relatively large floor box typical of present day raised floor installations. As mentioned previously the installer of such a floor system is required to cut away portions of the injection molded synthetic panel in order to accommodate such a floor box in this LEGRAND system.

Figure 3:
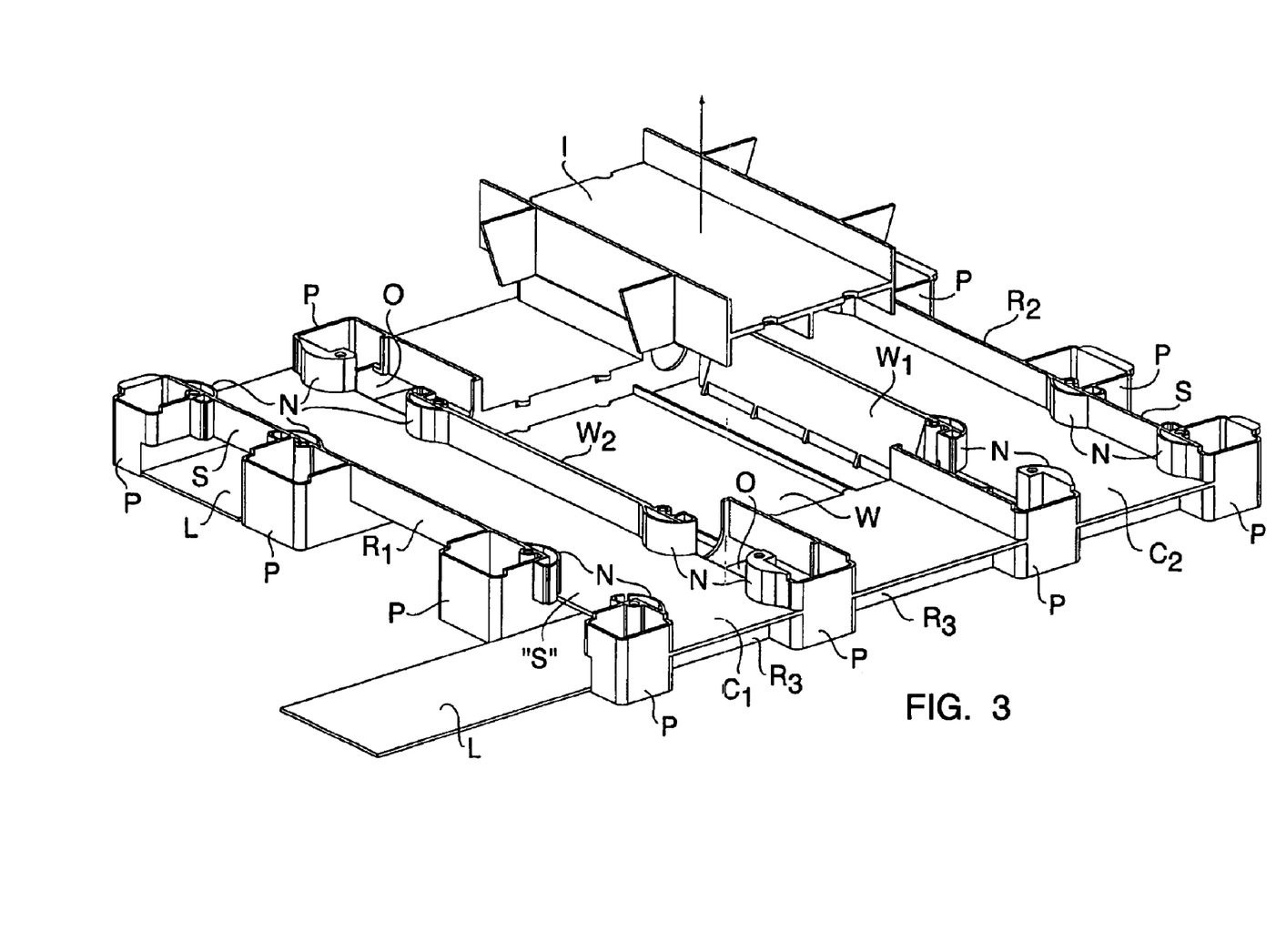
FIG. 3 shows an injection molded panel together with snap-in insert, and cover panels associated with the lower raceways in accordance with the present invention.

Referring now to FIG. 3, a molded panel synthetic floor, similar to those described above, can be seen to include improvements that allow the following advantages to be realized. First, a relatively large floor box or well is defined in the molded panel of FIG. 3 at W. A readily removable snap-in insert I as suggested in this view. This provides the well W with side edges $W_1$ and $W_2$ designed to accommodate either relatively small individual outlet devices, as suggested in FIG. 4 and in FIG. 5 at 30, 30, or to instead accommodate a relatively massive floor box of generally square configuration, such as for example a Walker fully adjustable Multi-Service Floor Box with Source III activation options.

The injection-molded panel of FIG. 3 further includes posts or pillars P, P spaced peripherally around the rectangular panels. These pillars are similar to those utilized in the LEGRAND floor system, and in the prior art system disclosed in the '289 patent in that they lend structural rigidity to the raised floor structure itself. At least two upwardly open channels $C_1$ and $C_2$ are defined by integrally molded ribs, which ribs $R_1$ and $R_2$ are shown to have segments or sections S, S, that can be broken out or removed. These sections are preferably molded in place, and removed in the field as a result of providing lines of weakening in areas at the ends of these segments "S" to facilitate removal in the field by the installer.

Still with reference to FIG. 3, the ribs ($R_1$, $R_2$) define the two upwardly open channels, and include radiused nose portions N, N integrally molded in the structure to relieve the bend radius of the cabling provided in the channels, and run through the access passageways "S" defined in part by the removable rib segments (S). These passageways "S" are further defined by openings (O, O) provided for this purpose in the rib portion $R_3$ of the downwardly open raceway channels.

Still with reference to FIG. 3, flat covers (L, L) can be either slid in place as suggested in the drawing, or provided with projecting rib portions integrally formed in the covers to be received in complementary shaped portions of the downwardly projecting ribs of the panel.

Figure 4:
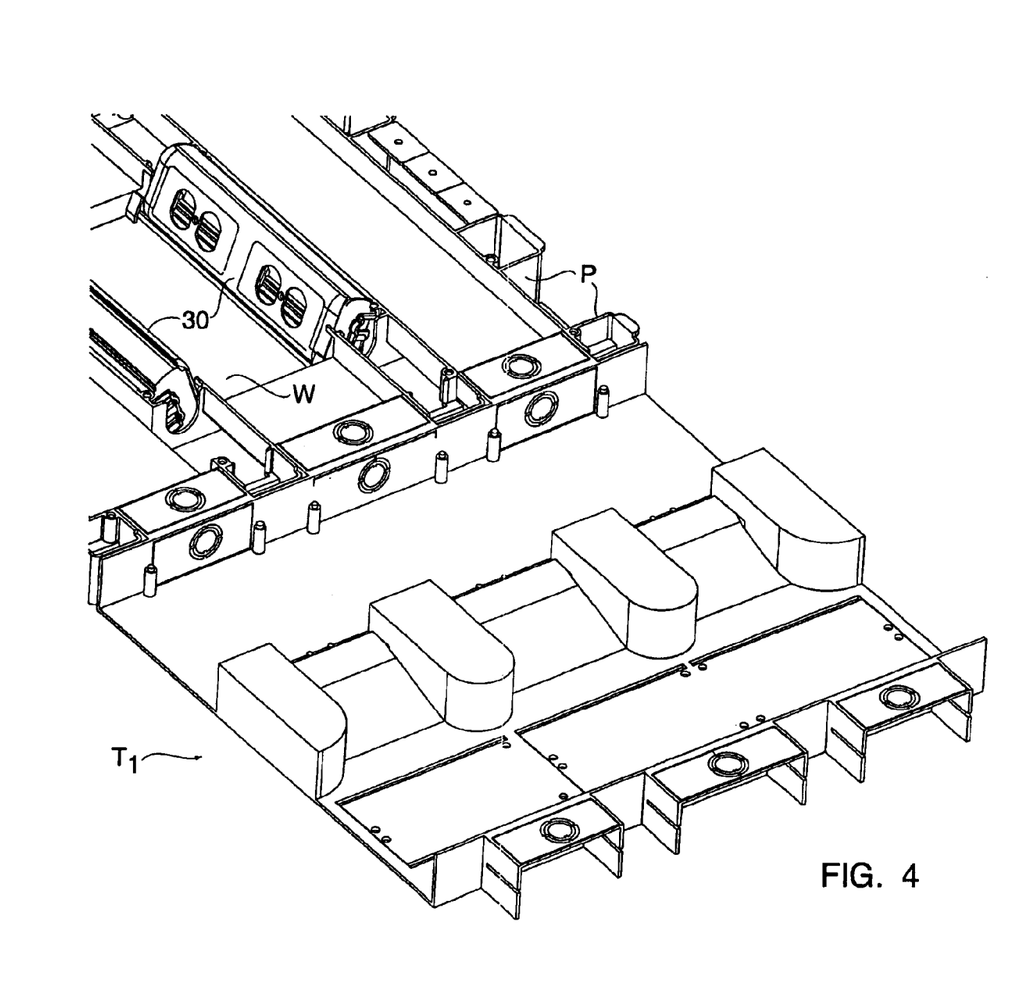
FIG. 4 shows a raceway panel of the present invention together with a fitting for feeding in data, communication, and power leads from the subfloor. Also shown are junction boxes fitted into the space normally filled wit an insert as shown in FIG. 3.
Figure 5:
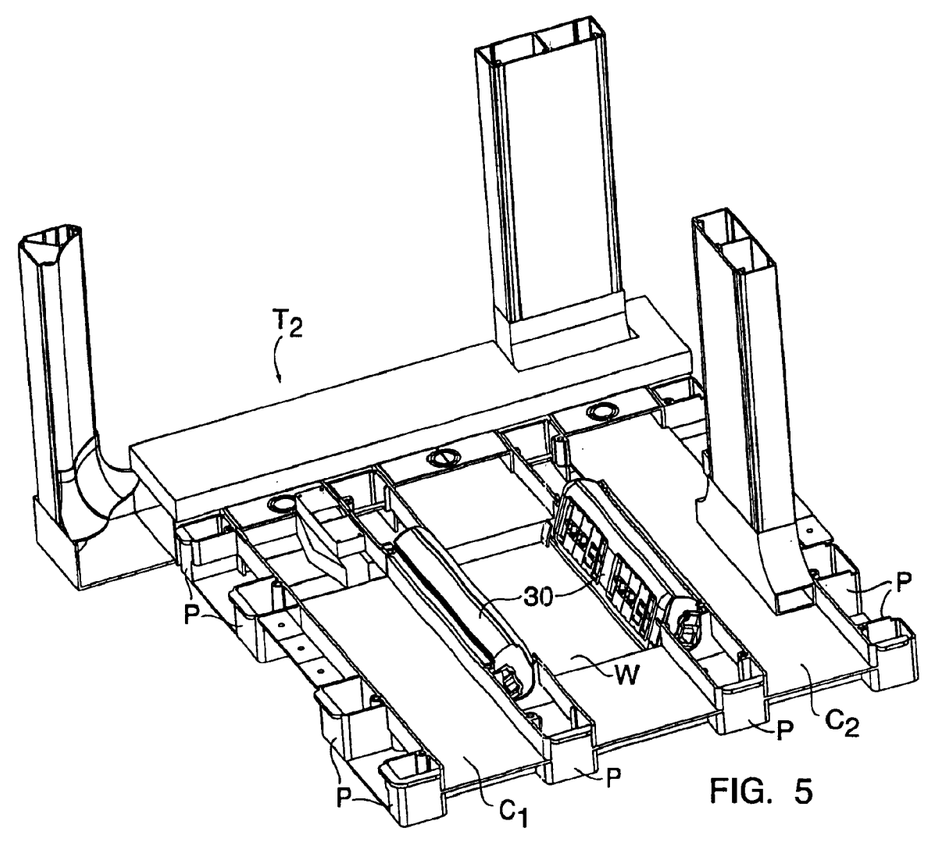
FIG. 5 illustrates a panel of the present invention fitted with down feeds of three different varieties together with several junction box configurations achieved as a result of the removal of the insert from the center portion of the panel.

Although not readily apparently from the single panel shown in FIGS. 3, and 4 and 5, the present invention takes advantage of a feature disclosed both in the '289 patent and in the LEGRAND system whereby the panels are adapted to be brought together in aligned relationship by reason of interlocking tabs provided on two adjacent sides of each square/rectangular panel. These interlocking tabs cooperate with recesses defined for this purpose in an opposite two sides of each panel.

FIGS. 4 and 5 show transition panels, and connectors $T_1$ and $T_2$ such as can be used with the molded floor panels of FIG. 3 to provide an assembled raised floor.

DETAILED DESCRIPTION OF FIGS. 6–11 OF THE DRAWINGS

Turning to FIGS. 6–11 inclusively an injection molded synthetic plastic panel of the type described above with reference to the previous embodiment (FIG. 3) has somewhat different characteristics as will now be described.

Downwardly open raceway channels C" are provided to accommodate cabling in a direction perpendicular to the upwardly open channels C" as in the previous FIG. 3 embodiment. Cabling access or passageways 0' are also provided for routing the cables (not shown) between these upwardly and downwardly open raceway channels.

Figure 10:
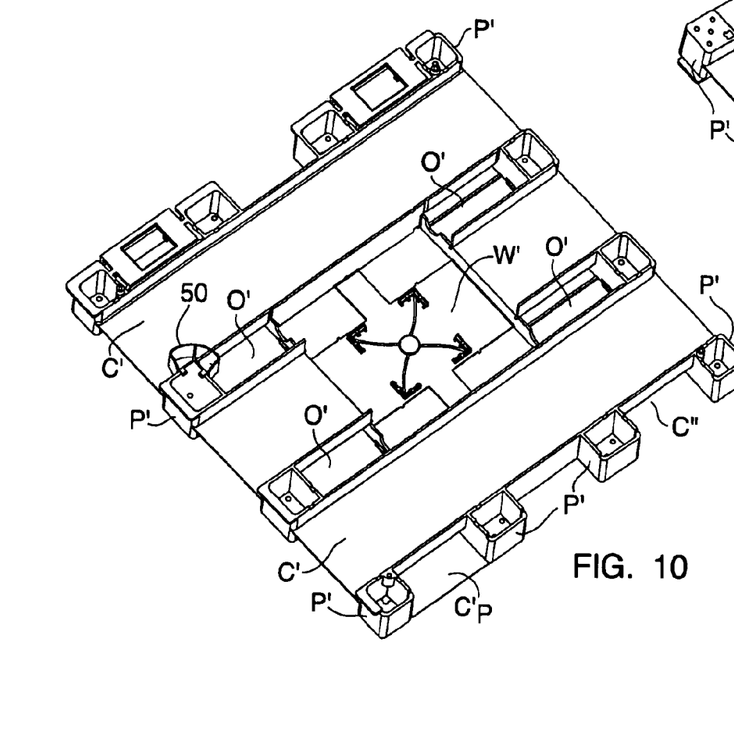
FIG. 10 is a top view of the panel illustrated in FIG. 7, but showing the radiused integrally molded corner provided to protect fiberoptic cabling in a floor panel of the present invention.
Figure 11:
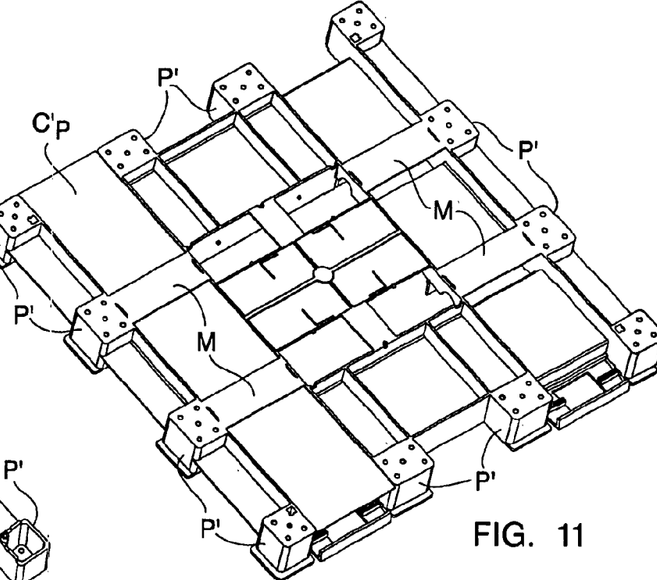
FIG. 11 is a bottom view of the panel depicted in FIG. 10, and serves to better illustrate the lower panel portions provided in the bottom of the downwardly open channels.

As best shown in FIGS. 10 and 11 (top and bottom perspectives respectively) a subfloor is not required to enclose the downwardly open raceway channels, and indeed the downwardly open raceway channels best shown in FIG. 11 are enclosed instead by panel portions $C'_p$ that are either slid into place as shown in the drawing, or in the alternative, snapped into place by reason of the resiliency of the panels. Nubs or projections are provided for this purpose on the underside of the panel for this purpose. As shown, cross members M, M, serve to hold the panels in place.

Still with reference to FIG. 10, a radiused corner element 50 is provided as shown, to maintain a two-inch bend radius for fiberoptic cabling running in the upwardly open raceway channel C' and routed downwardly through the passageway 0 the lower channel C" defined by the subfloor or panel $C'_p$. The cables (not shown) can be run in a direction perpendicular to that in the upwardly open channel C'.

Figure 6:
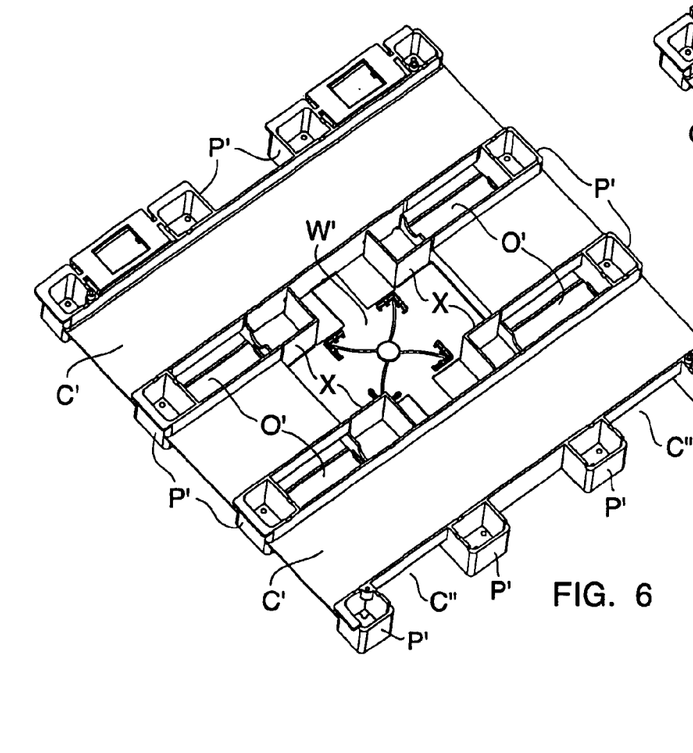
FIG. 6 is a perspective view of a panel constructed in accordance with an alternative embodiment of the present invention.
Figure 7:
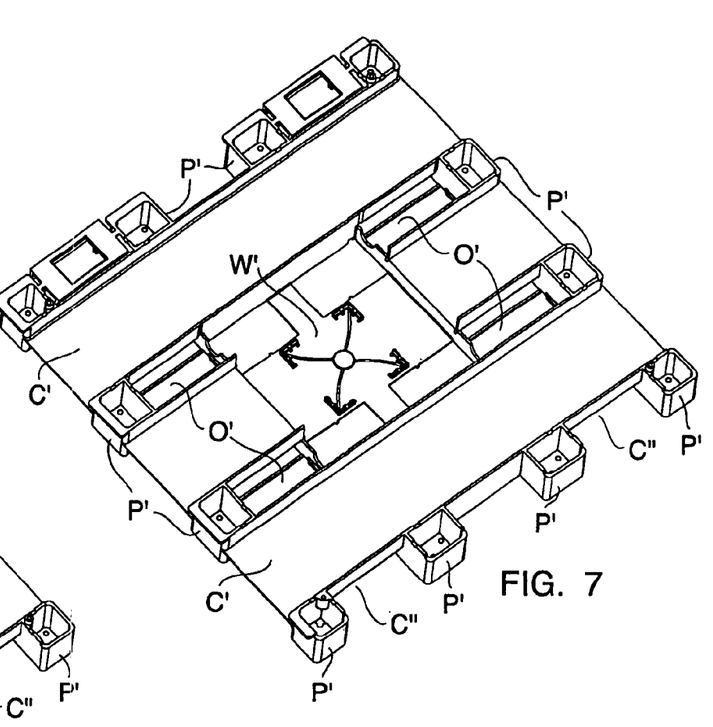
FIG. 7 is a view of the panel in FIG. 6 but with portions of the "snap-off inner corner pieces" broken away.
Figures 8, 9:
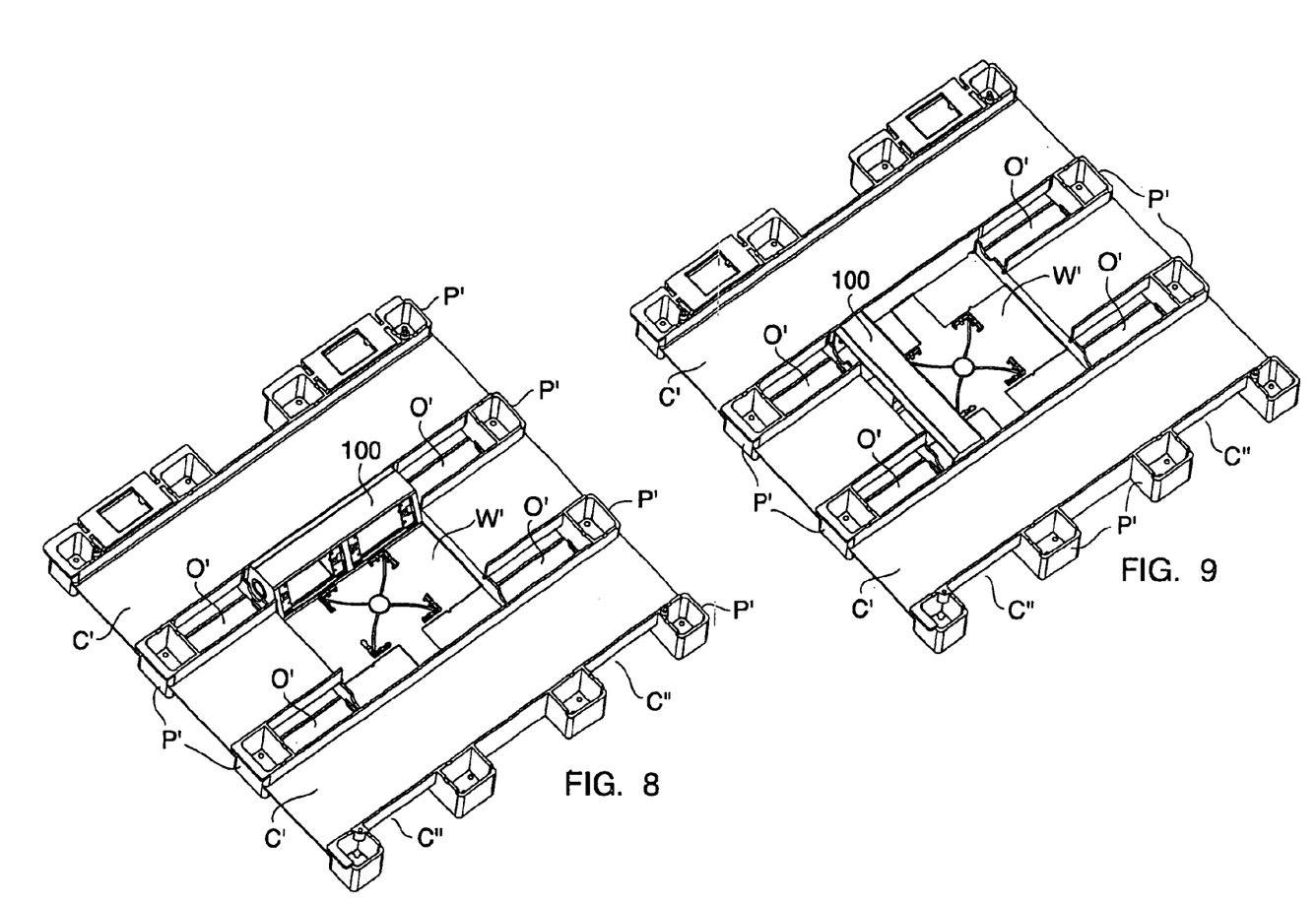
FIG. 8 is a view similar to FIG. 7 but with an activation bracket for power and data devices that are adapted to be received in openings defined for them in the activation bracket.
FIG. 9 is a view similar to FIG. 8 but with the activation bracket provided in an adjacent side of the generally square open recess provided in the center of the panel.

An important feature of the improved panel of FIGS. 6–11 can be attributed to the square configuration of the upwardly open recess W'. More particularly, one or more of four snap-off corner pieces (X, X), identified in FIGS. 6 and 7 can be removed, so one is left with a relatively large opening W' as shown in FIG. 7. The through openings (0', 0') can be utilized to receive either an activation bracket running in the same direction as the upwardly open raceway channel C', as shown in FIG. 8, or in the alternative this bracket can be provided in an adjacent but perpendicular side of the square recess for the same purpose, as illustrated at 100 in FIG. 9.

In summary, and as an aid for the workman in connection with installing a system of the present invention, the first step would be for the installer to insure that the finished floor (usually concrete) is clean and clear of debris.

Secondly, starting at one corner of the room, the installer will lay the first injection molded panel, together with its cover assembly (not shown in FIGS. 6–11) but described with reference to the previous embodiment. The base panel will preferably be fabricated for arrival at the job site with the composite wood top or cover panel attached.

The third step involves fastening the panel assembly to the floor, preferably with a mastic adhesive applied to the bottom of the plastic base. The pillar defining portions of the injection-molded panel of FIGS. 6–11 serve the same purpose as those described previously with reference to FIGS. 3–5, namely to provide rigidity to the floor system.

The next step would be to line up the tongue and grooves (not shown) on the edges of another panel, with those on the paneling already stuck to the floor, and to make sure that the second panel is square and level with the previous panel. It too is then fastened to the floor, preferably with a mastic adhesive.

The above installation of panels can be completed until a desired floor area is covered.

The next step is then to cut at least a certain number of the panels as required, with heavy-duty shears or snips, so as to install the floor around any obstructions or posts, to cover the area to be fitted with a floor of the present invention. One must assure that sufficient support is provided for these cut panels, and it is a feature of the present invention that the number of pillars or posts integrally molded into each base panel are numerous enough to serve this purpose. The channels in the base panel can be fitted with end caps so as to fully enclose the raceway channels in which the power and data cables will be strung. The cables are fed from a wall through a transition fitting, such as that described previously with reference to the earlier embodiment, and conventional conduit will be needed to feed the flooring system of the present invention. Thus, the transition fittings provide the necessary connections to existing conduit and include suitable knockouts in the end caps for this purpose.

Changes in the direction of the cable run can be conveniently carried out by removing an appropriate cover panel, removing the scored corner sections or wall sections as described previously, and the cabling pushed or fed in the desired directions. Separate radius control pieces maintain at least a 2-inch bend radius for fiberoptic cabling.

The cables in the raceways or channels can be secured with conventional wire or ties. The cables can be conveniently terminated in the floor boxes were appropriate and removal of any insert provides adequate wells W within the base panel as described previously to provide a floor box either centrally of the upwardly open recess as described in the previous embodiment, or to receive an activation bracket as suggested in FIGS. 8 and 9.

In the event a door area so requires, a ramp assembly can be provided to assure a 12-inch run for each one-inch rise in the floor height due to the elevation of the flooring system of the present invention.

Finally, carpet tiles or a similar floor treatment can be applied to the composite cover panels in accordance with the prior art '289 patent and LEGRAND systems described with reference to FIGS. 1 and 2 above.

DETAILED DESCRIPTION OF FIG. 12

Figure 12:
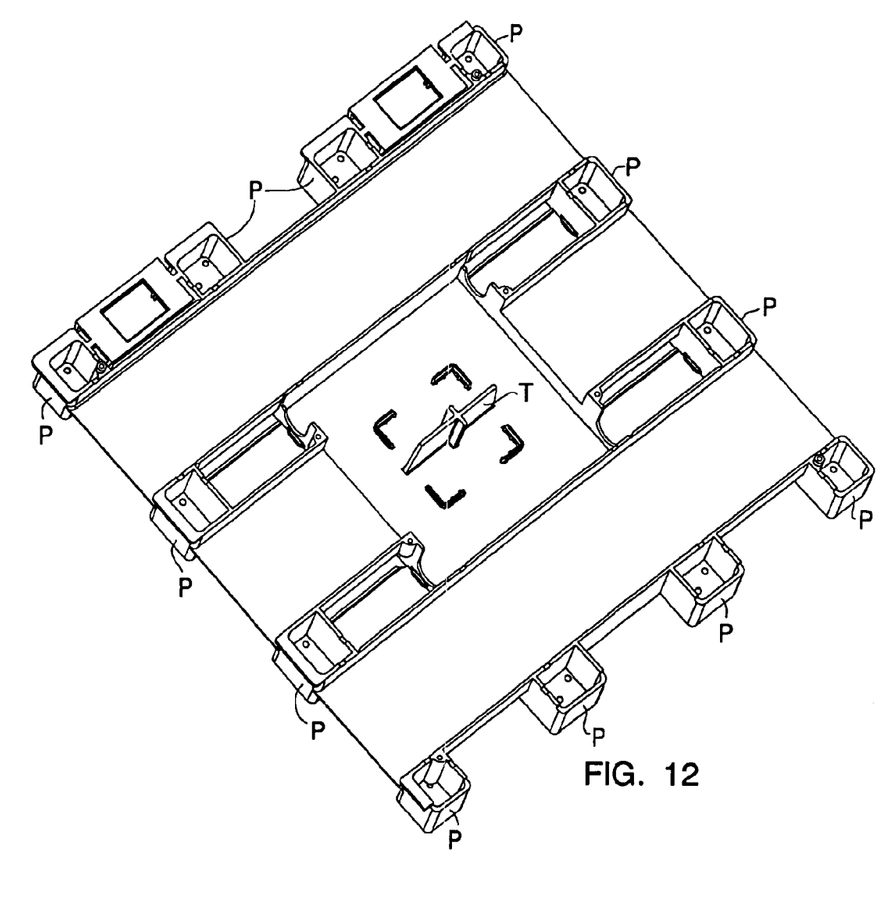
FIG. 12 is a perspective view of a second alternative molded plastic panel.

Another alternative design for the synthetic plastic injection molded subpanel of FIGS. 6–11 is shown in FIG. 12. It should be noted that the panel for FIGS. 6–11, when subjected to the snapping out of the inner corner pieces as suggested in FIG. 7, leads to a panel with support only around the perimeter in the form of the spaced posts or pillars. These pillars are arranged in generally equally spaced relationship around the perimeter of the generally square panel as shown in FIG. 12, and as described above with reference to FIGS. 6–11.

Still with reference to FIG. 7, the resulting openings provided after snapping off the inner corner pieces as suggested in FIGS. 6 and 7 leads to a panel that is limited to these peripherally spaced posts for supporting the floor panel provided in conjunction with the plastic panel that is the major component of the present invention.

In order to provide a more structurally effective panel FIG. 12 shows a center "T" that is formed in the plastic panel, and has a top edge at the center portion of the panel to come up to the same level as the top of the pillars or posts P, P.

Instead of the four openings in the center of the panel as shown in FIG. 7, the FIG. 12 embodiment provides for the same lateral side arrangement to receive two or more activation brackets such as those described above with reference to FIGS. 6–11. However, instead of an open hole behind such activation brackets the panel of FIG. 12 provides for a back to such activation brackets so the brackets can be fabricated without themselves including a back, lending greater efficiency to the injection molded production of the various components and parts of the present invention generally.

The small square outlined, center portion defining the "T", is itself removable in the same manner as described above with reference to the snap-off corner brackets (X) of FIGS. 6–11, and in the event that the use of a central floor "poke-through" device is to be installed (as available from Walker Systems).

In conclusion, the injection molded floor panel, or subpanel of FIG. 12 is intended for use as with the panel of FIGS. 6–11, and has many of the advantages outlined above for that panel of FIGS. 6–11. In addition, the FIG. 12 panel provides additional support for the top floor panel (not shown) placed on the subpanel during assembly of the floor all as described above with reference to the preceeding embodiments. While the raised rib or "T" serves the function of added support for the floor panel above it, another advantage to this configuration resides in the fact that when the molded plastic panel is made in an injection molded machine this configuration at the center greatly facilitates the injection molding process itself. During the injection molding process the flow of plastic in the mold can be greatly facilitated by reason of "risers" such as that defined by the raised rib in the center of the panel, designated a "T" herein.

In light of the above, it is therefore to be understood that within the scope of the appended claims, the invention may be practiced otherwise than as specifically described above.

What is claimed is:

1. A floor panel of synthetic molded material having a generally rectangular plan-form and upwardly projecting longitudinally extending ribs defining at least two upwardly open channels, said panel also defining integrally formed downwardly projecting laterally extending ribs defining at least two downwardly open channels oriented orthogonally to said upwardly open channels, said panel also being formed to define access passageways defined in part by gaps in said upwardly projecting ribs and in part by adjacent sections of said downwardly open channels to allow cables to pass between said upwardly and downwardly open channels, and an upwardly open recess defined by said panel between said at least two upwardly open channels and between said at least downwardly open channels.

2. The floor panel of claim 1 further including an insert for said recess, said panel and said insert together cooperating to define upstanding ribs to provide a third upwardly open channel between said at least two upwardly open channels.

3. The floor panel according to claim 2 further including laterally spaced longitudinally extending spaces defined between said ribs of said first, second and third channels.

4. The floor panel according to claim 3 further including at least one service box in said recess for data and/or power plug connections.

5. The floor panel according to claim 4 wherein said service box further includes device brackets for receiving power data plugs and jacks, said device brackets having ports communicated with said spaces between said ribs for wiring to run between said access passageways and said service box.

6. The floor panel according to claim 2 further including generally flat cover strips defining a lower wall for enclosing said downwardly open raceway channels.

7. The floor panel of claim 1 further including at least one service box in said recess for data and/or power communication connections.

8. The floor panel according to claim 1 wherein said gaps provided in said upwardly projecting ribs defining said upwardly open raceway channels are formed by lines of weakening that allow breaking out segments of said ribs during installation.

9. The floor panel according to claim 1 further including a top floor cover panel of composite material secured to said synthetic molded plastic floor panel.

10. The floor panel according to claim 1 wherein peripherally spaced pillars, for posts) are provided integrally of said molded synthetic floor panel.

11. The floor panel according to claim 10 wherein said upwardly open recess is of generally quadrilateral shape and further includes a bottom wall recessed below said upwardly open channels and providing said recess with a depth at least approximately the full height of said pillars (for posts).

12. The floor panel according to claim 11 further including an integrally molded rib located generally centrally of said recess and having an upper edge in the same plane as that defining the tops of said pillars, (or post).

* * * * *

UNITED STATES PATENT AND TRADEMARK OFFICE
CERTIFICATE OF CORRECTION

PATENT NO. : 6,865,851 B2
DATED : March 15, 2005
INVENTOR(S) : Shawn Stempinski

It is certified that error appears in the above-identified patent and that said Letters Patent is hereby corrected as shown below:

<u>Column 8,</u>
Line 13, "for posts)" should read -- (or posts) --.
Line 19, "(for posts)" should read -- (or posts) --.

Signed and Sealed this

Seventh Day of June, 2005

JON W. DUDAS
*Director of the United States Patent and Trademark Office*